May 26, 1925.

W. B. BRONANDER

MECHANICAL MOVEMENT

Filed May 22, 1924

1,539,294

INVENTOR.
Wilhelm B. Bronander
BY Sydney J. Prescott
ATTORNEYS.

Patented May 26, 1925.

1,539,294

UNITED STATES PATENT OFFICE.

WILHELM B. BRONANDER, OF MONTCLAIR, NEW JERSEY, ASSIGNOR TO AMERICAN MACHINE & FOUNDRY COMPANY, A CORPORATION OF NEW JERSEY.

MECHANICAL MOVEMENT.

Application filed May 22, 1924. Serial No. 715,015.

*To all whom it may concern:*

Be it known that I, WILHELM B. BRONANDER, a citizen of the United States, residing at Montclair, county of Essex, and State of New Jersey, have invented a new and useful Improvement in Mechanical Movements, of which the following is a specification.

This invention relates to a mechanical movement which is capable of many uses but is particularly adaptable for use in machines where indexing is necessary; that is to say, where a turret or other machine element is given a step by step rotating movement.

In machines in which an element of considerable weight must be given intermittent movements, the inertia of the mass is an important factor, and it frequently happens that the speed of such a machine, or the rapidity with which its cycle of operations can be repeated, is limited by the noise produced, excessive vibration, and other detrimental results, which are due to the inertia of the indexing mechanism. The main object of the present invention is to overcome this difficulty by the provision of a mechanical movement operating to start the mass slowly, then accelerate it, then retard it, and finally bring it to a condition of rest so gently that the speed of the machine may be materially increased without producing the detrimental effects heretofore found unavoidable. A further object of the invention is the production of such a device which is cam-controlled, the cam used being replaceable with others of different contour in order that a different number of intermittent movements per revolution of the driven member may be made, and in order that the periods of movement and dwell may be varied within limits as desired.

With these and other objects not specifically mentioned in view, the invention consists in certain constructions and combinations which will be hereinafter fully described and then specifically set forth in the claims hereunto appended.

Figure 1:
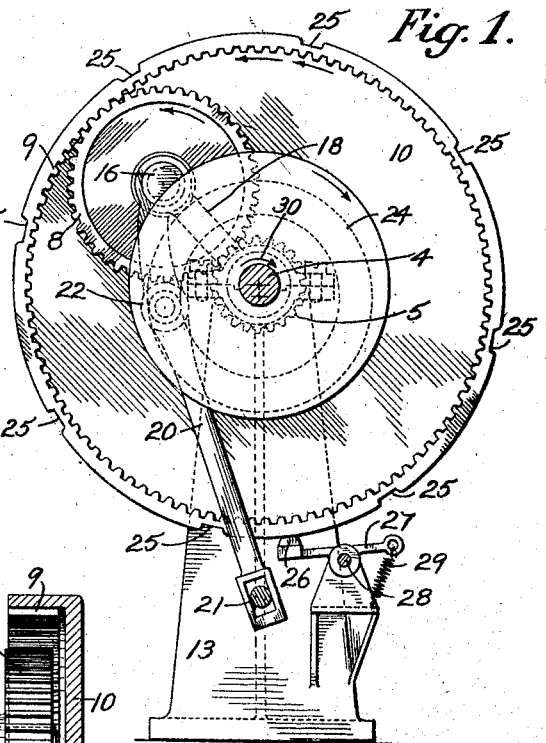
Figure 3:
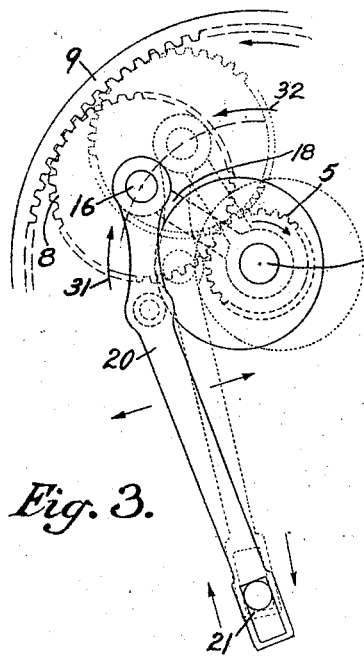
Figure 2:
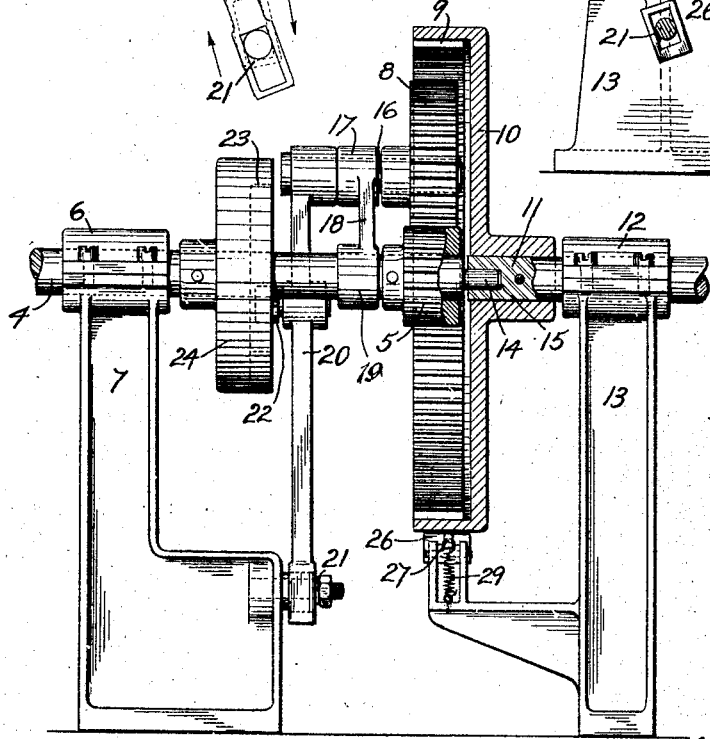

In the accompanying drawings, which form a part of this specification and in which like characters of reference indicate the same or like parts, Fig. 1 is a front elevation of a device constructed in accordance with the invention, certain parts being omitted; Fig. 2 is a side elevation, partly in section, of the structure shown in Fig. 1; and Fig. 3 is a diagrammatic view illustrating the operation of the device.

In carrying the invention into effect, there is provided a constantly moving primary member deriving its motion from any suitable source. There is further provided a secondary member which is movable in constant engagement with said primary member, and a tertiary member in constant engagement with said secondary member. And there is further provided means for producing a to and fro movement of the secondary member to produce from the constant movement of the primary member an intermittent movement of the tertiary member. In the best constructions, these members are spur gears arranged in a planetary group and in the same plane; the said means is cam-actuated; and means are provided for locking the tertiary member when it is not in motion. The above mentioned members and means may be widely varied in construction within the scope of the claims, for the particular device selected to illustrate the invention is but one of many possible concrete embodiments of the same. The invention therefore is not to be restricted to the precise details of the structure shown and described.

In the particular device selected to illustrate the invention, the primary member includes a rotating shaft 4 and a spur pinion 5 carried thereby. The shaft 4 is journaled in a bearing 6 formed on a pedestal 7. The shaft 4 rotates constantly, as in the direction of the arrow in Fig. 1, and it may derive its motion from any suitable source. As shown, the secondary member includes a spur gear 8 which is constantly in mesh with the pinion 5; and as shown, the tertiary member includes an internal gear 9 which is constantly in mesh with the secondary member or spur gear 8. The tertiary member or internal gear 9 is carried by a wheel 10 pinned to or otherwise secured upon a shaft 11, this shaft being journaled in a bearing 12 formed in a pedestal 13. The end of the shaft 4, beyond the pinion 5, has a reduced end 14 projecting into the short bore 15 in the end of the shaft 11 adjacent the pinion 5. This bore serves as a bearing for the reduced end 14 of the shaft 4, and the shafts therefore are in axial alignment.

The secondary member or spur gear 8 is loosely mounted on a stud 16 fast in a boss 17 formed on one end of a radius arm 18 which has a second boss 19 loosely mounted on the shaft 4 before referred to. This radius arm keeps the secondary member or gear 8 in proper mesh with the pinion 5 and the internal gear 9, but permits its movement in an arc concentric therewith, and of course permits its free rotation on the stud 16. The stud 16 projects beyond the boss 17 and to its projecting end is pivoted one end of a floating cam lever 20 having a pin and slot fulcrum 21, the pin of which is secured to the pedestal 7 and the slot of which is formed in the end of the lever. The cam lever 20 carries a cam bowl 22 tracking in a groove 23 formed in a cam 24 fast on the shaft 4 and therefore driven thereby.

The tertiary member, which, it will be remembered, includes the internal gear 9 and wheel 10, is given intermittent movements; and for the purpose of accurately indexing said tertiary member in the event of wear, the periphery of the wheel 10 is provided with a series of notches 25 successively engaged by a locking pawl 26 formed on a lever 27 fulcrumed at 28 to the pedestal 13. The end of the lever 27 opposite the pawl 26 is connected to one end of a spring 29, the other end of the spring being connected to the pedestal 13. This spring acts to keep the pawl in constant contact with the periphery of the wheel 10.

The speed of the various movements is controlled by the contour of the cam groove, and this of course, within limits, can be formed to periodically start, accelerate, retard and stop the tertiary member including the internal gear 9 and wheel 10. The distance between the notches is also governed by the conformation of the cam groove, and while eight of such notches are shown, the number will vary with variations of the cam groove. The greater the arc of travel of the cam during which the opposite angular velocities of the radius arm 18 and the internal gear 9 are made to coincide, the longer and more frequent will be the stops per revolution of the wheel 10.

Since the various parts of the device are always in mesh and not subject to shock, the device runs silently, the inertia of the wheel 10 is readily overcome without setting up excessive vibration or other difficulties, and the interchangeability of cams makes the device extremely flexible so far as variations of period and extent of movement and of dwell are concerned.

The operation of the device is as follows: As the engagement of the cam bowl 22 with the cam groove 23 causes the lever 20 to swing towards the shaft 4 during rotation of the latter in the direction of the arrow 30 (see Fig. 3), the connection of the lever with the stud 16, carried by the radius arm 18, moves the secondary member or gear 8 in the direction of the arrow 31, or from the position shown in full lines in Fig. 3 to that shown in dotted lines. During this movement, the gear 8 is rotated on its own axis by the pinion 5, at varying speed, but it rolls around on the internal gear 9, producing little or no movement thereof. On the return movement of the gear 8, indicated by the arrow 32, from the dotted line position to the full line position, the internal gear 9 is moved at a varying surface speed in excess of that of the pinion 5. During secondary member movement in the direction of the arrow 31, therefore, the tertiary member or wheel 10 is at rest, while during the opposite movement it is moved. Thus, the production of the to and fro movement of the secondary member produces from the constant movement of the primary member an intermittent movement of the tertiary member. The to and fro movement of the gear 8 is controlled by the contour of the cam groove 23 which is irregularly eccentric in accordance with the desired relation between movement and dwell, and between acceleration and retardation, of the tertiary member. By varying the eccentricity of the cam groove 23, a considerable range of variations may be obtained without other change in the device.

What is claimed is:

1. A mechanical movement comprising a constantly moving primary member, a secondary member in constant engagement with said primary member, a tertiary member in constant engagement with said secondary member, and cam-actuated means including a floating lever having a pin and slot fulcrum for producing a to and fro movement of said secondary member to produce from the constant movement of said primary member an intermittent movement of said tertiary member.

2. A mechanical movement comprising a constantly moving primary member, a secondary member in constant engagement with said primary member, a tertiary member in constant engagement with said secondary member, and cam-actuated means including a floating lever having a pin and slot fulcrum for producing a to and fro movement of said secondary member to produce from the constant movement of said primary member an intermittent movement of said tertiary member, said primary member including a rotating shaft and a spur pinion carried thereby.

3. A mechanical movement comprising a constantly moving primary member, a secondary member in constant engagement with said primary member, a tertiary member in constant engagement with said secondary member, and cam-actuated means including a floating lever having a pin and slot fulcrum for producing a to and fro movement of said secondary member to produce from the constant movement of said primary member an intermittent movement of said tertiary member, said primary member including a rotating shaft and a spur pinion carried thereby, and said secondary member including a spur gear in mesh with said pinion.

4. A mechanical movement comprising a constantly moving primary member, a secondary member in constant engagement with said primary member, a tertiary member in constant engagement with said secondary member, and cam-actuated means including a floating lever having a pin and slot fulcrum for producing a to and fro movement of said secondary member to produce from the constant movement of said primary member an intermittent movement of said tertiary member, said primary member including a rotating shaft and a spur pinion carried thereby, said secondary member including a spur gear in mesh with said pinion, and said tertiary member including an internal gear in mesh with said spur gear.

5. A mechanical movement comprising a constantly moving primary member, a secondary member in constant engagement with said primary member, a tertiary member in constant engagement with said secondary member, and cam-actuated means including a floating lever having a pin and slot fulcrum for producing a to and fro movement of said secondary member to produce from the constant movement of said primary member an intermittent movement of said tertiary member, said members being in the same plane.

6. A mechanical movement comprising a constantly moving primary member, a secondary member in constant engagement with said primary member, a tertiary member in constant engagement with said secondary member, and cam-actuated means including a floating lever having a pin and slot fulcrum for producing a to and fro movement of said secondary member to produce from the constant movement of said primary member an intermittent movement of said tertiary member, said primary and tertiary members including shafts in axial alignment.

7. A mechanical movement comprising a constantly moving primary member, a secondary member in constant engagement with said primary member, a tertiary member in constant engagement with said secondary member, and cam-actuated means including a floating lever having a pin and slot fulcrum for producing a to and fro movement of said secondary member to produce from the constant movement of said primary member an intermittent movement of said tertiary member, and means for locking said tertiary member when not in motion.

8. A mechanical movement comprising a constantly moving primary member, a secondary member in constant engagement with said primary member, a tertiary member in constant engagement with said secondary member, and means including a floating lever having a pin and slot fulcrum for producing a to and fro movement of said secondary member to produce from the constant movement of said primary member an intermittent movement of said tertiary member, said primary and tertiary members being concentrically positioned with said secondary member interposed between them.

9. A mechanical movement comprising a constantly moving primary member, a secondary member in constant engagement with said primary member, a tertiary member in constant engagement with said secondary member, and cam-actuated means including a floating lever having a pin and slot fulcrum for producing a to and fro movement of said secondary member to produce from the constant movement of said primary member an intermittent movement of said tertiary member, said means including a radius arm for keeping said secondary member in free running engagement with said primary and tertiary members.

10. A mechanical movement comprising a constantly moving primary member, a secondary member in constant engagement with said primary member, a tertiary member in constant engagement with said secondary member, and cam-actuated means including a floating lever having a pin and slot fulcrum for producing a to and fro movement of said secondary member to produce from the constant movement of said primary member an intermittent movement of said tertiary member, said means including a cam which is interchangeable with others of different contour for altering the periods of movement and of dwell of said tertiary member.

11. A mechanical movement comprising a constantly moving primary member, a secondary member in constant engagement with said primary member, a tertiary member in constant engagement with said secondary member, and cam-actuated means including a floating lever having a pin and slot fulcrum for producing a to and fro movement of said secondary member to produce from the constant movement of said primary member an intermittent movement of said tertiary member, said tertiary member including a shaft and wheel fast thereon.

12. A mechanical movement comprising a constantly moving primary member, a secondary member in constant engagement with said primary member, a tertiary member in constant engagement with said secondary member, and cam-actuated means including a floating lever having a pin and slot fulcrum for producing a to and fro movement of said secondary member to produce from the constant movement of said primary member an intermittent movement of said tertiary member, said primary member including a shaft having a reduced end, and said tertiary member including a shaft having an axial bore forming a bearing for said reduced end.

13. A mechanical movement comprising a constantly moving primary member, a secondary member in constant engagement with said primary member, a tertiary member in constant engagement with said secondary member, and means for producing a to and fro movement of said secondary member to produce from the constant movement of said primary member an intermittent movement of said tertiary member, said means including a cam carried by said primary member.

14. A mechanical movement comprising a constantly moving primary member, a secondary member in constant engagement with said primary member, a tertiary member in constant engagement with said secondary member, and cam-actuated means for producing a to and fro movement of said secondary member to produce from the constant movement of said primary member an intermittent movement of said tertiary member, said primary member including a rotating shaft and a spur pinion carried thereby, said secondary member including a spur gear in mesh with said pinion, said tertiary member including an internal gear in mesh with said spur gear, and said means including a radius arm for keeping said spur gear in free running mesh with said pinion and internal gear, and a floating lever coacting with said radius arm to support said spur gear and having a pin and slot fulcrum.

In testimony whereof, I have signed my name to this specification.

WILHELM B. BRONANDER.